INVENTOR.
JAMES COOLIDGE CARTER
BY
Kenyon & Kenyon
ATTORNEYS

United States Patent Office 2,738,095
Patented Mar. 13, 1956

2,738,095

PRESSURE CLOSURE

James Coolidge Carter, Pasadena, Calif., assignor to The J. C. Carter Company, Pasadena, Calif., a corporation of California Application January 12, 1953, Serial No. 330,657

5 Claims. (Cl. 220—40)

This invention relates to a closure assembly for sealing fluid containing tanks and particularly to such closures for tanks wherein there may be a substantial differential in pressure between the inside of the tank and the outside of the tank. It especially relates to such a closure assembly which may be located on any surface of the tank, including the bottom thereof.

It is an object of this invention to provide a closure assembly that will provide a positive seal under the conditions of varying tank and atmospheric pressures encountered under service conditions, caused by extreme temperatures and by movement of the tank from high altitudes to low altitudes and back again, as in aircraft. It is a further object to provide such a closure wherein the pressure differential between the tank and the atmosphere, particularly when the tank pressure is higher than the atmospheric pressure, is utilized to increase the tightness of the seal provided by the closure.

It is an advantage of a closure assembly in accordance with the present invention that it is light in weight, simple in operation, and flat and thin so as not to require special streamlining measures when used on aircraft.

At the present time many fluid tanks on aircraft, and especially fuel tanks, are designed to be filled from the bottom. Such a tank is usually provided with an internal valve in the opening thereof, which may be opened only by thrusting a mating type of hose nozzle against it. Exterior of said valve is a closure assembly which must be opened in order to permit the nozzle to be thrust into the tank. It is an important function of the closure assembly to maintain a fluid seal between the atmosphere and the interior of the tank. The closure should prevent the passage of gases of liquids and assure against leakage even though the pressure within the tank becomes much higher than that outside. The tank may be filled at ground level, closed, and then transported high into the atmosphere. While the internal pressure in the tank remains about the same, as for example, when the airplane uses fuel from another tank. The pressure in the outside atmosphere may drop very substantially, in which case there is a much greater pressure inside the tank than there is outside. If the closure is located on the bottom of the tank, then to this positive pressure inside the tank may be added the pressure due to the weight of the contents multiplied by as many times the force of gravity as the maneuvering conditions of the aircraft carrying the tank create. It is obvious, therefore, that the operating conditions to which such closure assemblies are subjected are severe indeed and demanding of high performance. The importance of foolproof operation cannot be overestimated since fuel leaks are very serious matters from the point of view of the creation of fire hazards, both in the air and on the ground, as well as the obvious hazard of running out of fuel.

Other objects and advantages of this invention will be apparent to those skilled in the art from the accompanying description of a preferred embodiment and from the drawings, in which.

Figures 1, 2, 3:
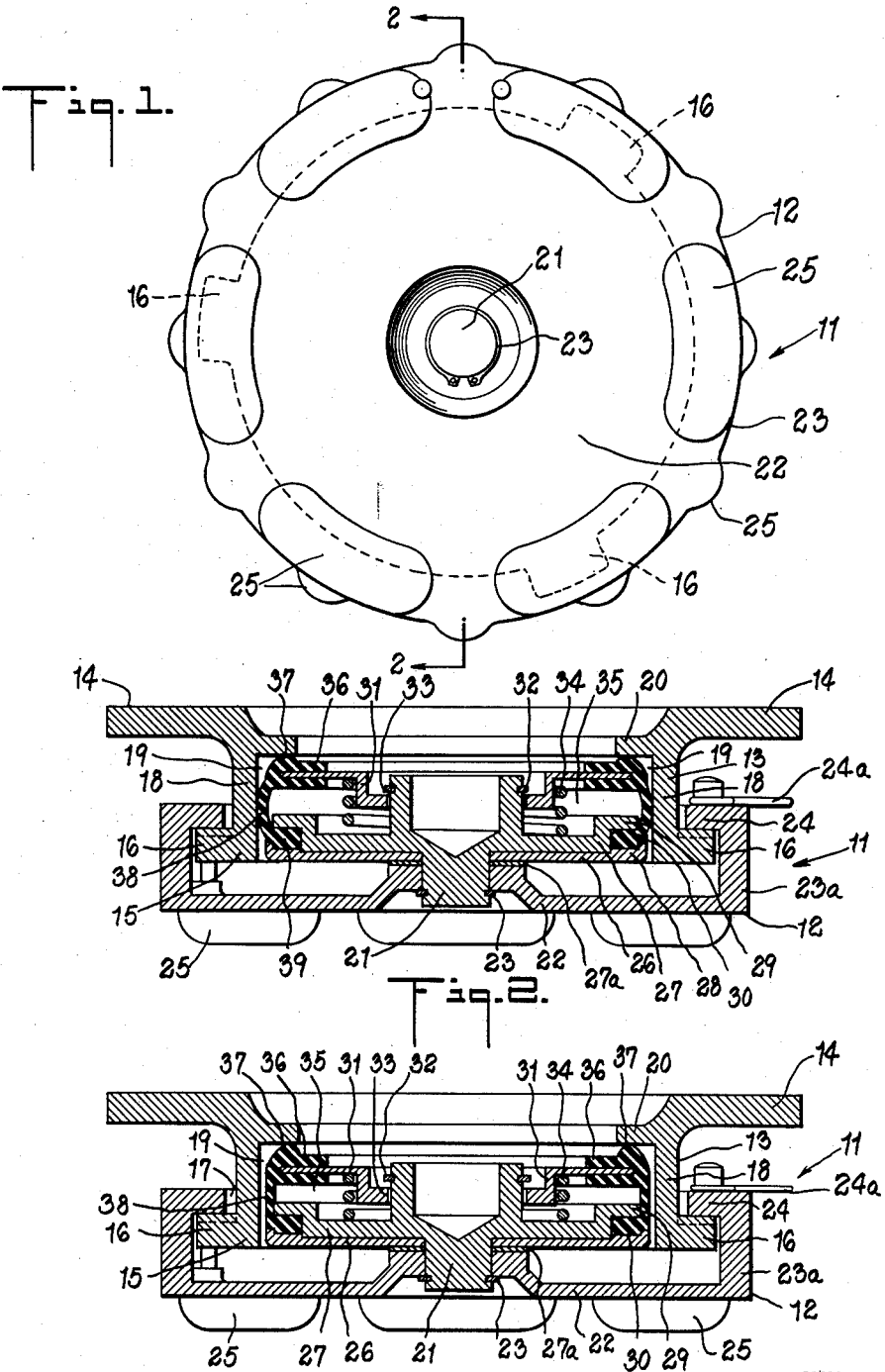
Fig. 1 is a plan view of the closure assembly.
Fig. 2 is a sectional view taken along the line 2—2 of Fig. 1 and showing the assembly under a condition of positive pressure in the tank.
Fig. 3 is the same section shown as Fig. 2 but the assembly is under a condition of negative pressure in the tank.

Referring to the drawing, as shown in Figs. 1 and 2, the closure assembly 11 comprises a generally circular cap member 12 and a generally circular coupling member 13. The coupling member 13 has an end portion 14 adapted to be affixed to a fluid tank (not shown) as by means of rivets or a weldment. The coupling 13 has an opposite end portion 15 incorporating means adapted to cooperate with means on said cap member 12 adapting the coupling member to be removably attached to the cap member. Preferably said means on the coupling member 13 comprises a plurality of male bayonet joint members 16 adapted to cooperate with female bayonet joint members 17 on the cap member. The coupling member 13 has generally cylindrical side walls 18 between the end portions 14 and 15. Said walls form a passage 19 permitting the flow of fluids through said coupling member. An annular lip 20 is positioned on said side walls 18 and extends part way into the passage 19. Said lip serves as a seat for a gasket on the cap member as will be hereinafter more fully set forth.

The cap member 12 comprises a generally cylindrical, centrally-disposed spindle 21, having a generally circular first plate 22, fitted on said spindle. A retaining ring 23, or other suitable stop, on the end of said spindle holds plate 22 in position. The first plate 22 has an upturned flange 23a and a flange 24 and located on the flange 24 are means adapted to cooperate with the aforesaid means on the coupling member to permit the cap member to be removably attached to the coupling member. Such means on the flange 24 preferably consist of a plurality of female, bayonet-joint members 17. The first plate 22 also may have, on its exterior surfaces, a plurality of raised elements 25, adapted to provide a grippable surface for the user and for other purposes not important in connection with this invention. The flange 24 may also have a chain 24a riveted to it to provide an attachment of the cap assembly to the tank or aircraft surface.

A generally circular second plate 26 is slidably mounted on the spindle 21 next to the first plate. A generally circular third plate 27 is affixed to and is preferably integral with said spindle, much like a wheel on a hub, and serves as a shoulder or abutment against which plate 26 rests. A shim 27a may be used to give a tight assembly between plate 27 and ring 23. The periphery of the second plate 26 and the oppositely disposed periphery of the third plate 27 have means thereon cooperating with each other and adapted to grip and retain the edge portion of a gasket therebetween and form an airtight seal therewith, such means preferably consists of a raised ring or flange 28 on the second plate and an offset section or rim 29 on the third plate, providing a restricted opening 30 therebetween. A generally circular fourth plate 31 is slidably and loosely mounted on said spindle. The travel of said fourth plate towards the nearest end to it of the spindle 21 is limited by a retaining ring 32, or other suitable stop on said spindle. The loose mounting of plate 31 provides a space or gap 33 between the fourth plate 31 and the spindle 21, providing communication between the tank and the space between the outer face of plate 31 and the remainder of the assembly. A compressed spring 34 is positioned between the third and fourth plates. The spring 34 urges the third and fourth plates apart, forms a chamber 35 therebetween and presses the fourth plate towards the end of the spindle nearest to it. A flexible gasket 36, preferably made of a flexible, deformable rubber, is bonded to the periphery of said fourth plate 31, on both sides of said plate. Gasket 36 has an upstanding ring or ridge 37 on the face of the fourth plate opposite spring 34 enclosing an area less than the area of said plate 31. The ring or ridge 37 is adapted to contact and deform plastically against lip 20 of the coupling member 13 when the cap member is attached to the coupling member. The gasket 36 extends beyond the edge of plate 31 and has a cylindrical, flexible and extensible wall section 38 extending from the fourth plate 31 generally parallel to the sides of the spindle to the peripheries of the second and third plates, and the gasket has its distal end 39 gripped between the oppositely disposed gripping means 28 and 29 of the second and third plates. The cylindrical section 38 of said gasket is disposed generally concentric with ring or ridge 37 but is spaced externally thereof with reference to the spindle 21. Thus the area of the fourth plate within the ring 37 is less than the area of that plate within the cylindrical section 38. The gasket 36 seals chamber 35 existing between the third and fourth plates except for the gap 33 between the nearest surfaces of the fourth plate and the spindle.

The operation of the device is best understood by a comparison of Figs. 3 and 2. In Fig. 3, a condition of low pressure in the tank exists. In this condition the spring 34 urges the fourth plate 31 and its attached gasket 36 and sealing ring 37 against the lip 20 of coupling member 13 and forms a fluid seal.

Fig. 2 demonstrates the operation of the invention when the pressure in the tank is higher than in Fig. 3. In this condition, fluid passes from the tank through the gap 33 between the fourth plate and the spindle and into the otherwise sealed chamber 35 between the third and fourth plates. The total force on each of the opposite sides of the fourth plate is thereby unbalanced because the area within the ring or ridge 37 on the tank side of the fourth plate is less than the area within the cylindrical section 38 of the gasket on the other side of the fourth plate, although the pressure per unit of area is the same. As the tank pressure increases, the ring or ridge 37 is pressed ever more tightly against the lip 20 of the coupling member, thereby increasing the tightness of the seal therebetween. The spring 34 is designed to overcome a 3-pounds-per-square-inch pressure. Thus, even when there is a higher pressure outside the tank than inside, the seal remains fluidtight.

From the foregoing it can be seen that the greater the differential in pressure between the tank and the surrounding atmosphere the better is the seal created thereby.

Having thus described the invention, what is claimed is:

1. A pressure fuel cap assembly comprising a generally circular cap member and a generally cylindrical coupling member, said coupling member having an end portion adapted to be affixed to a fuel tank and an opposite end portion having coupling means adapted to cooperate with opposite coupling means on said cap member, adapting said coupling member to be removably attached to said cap member, said coupling member having generally cylindrical side walls between said end portions forming a cylindrical passage therebetween to permit the flow of fluids, and a continuous annular lip on said side walls extending part way into said passage, said cap member comprising a generally circular, fixed plate adapted to fit loosely within the side walls of said coupling member and having a spindle having portions extending both inwardly and outwardly from said fixed plate, a clamping plate on the outwardly extending portion of said spindle adjacent said fixed plate, the peripheries of said plates having clamping means adapted to clamp the edge of a gasket therebetween to form a fluidtight seal, an outer plate on said outwardly extending portion of said spindle carrying coupling means to cooperate with the coupling means on said coupling member, a movable plate loosely mounted for sliding movement on the inwardly extending portion of said spindle to provide a fluid passage between said movable plate and said spindle and adapted to fit loosely within the side walls of said coupling member, a compressed spring disposed between and bearing on said fixed plate and said movable plate to urge them apart and form a chamber therebetween, a flexible gasket bonded to the periphery of said movable plate and having generally cylindrical walls extending therefrom to and clamped in the clamping means of said fixed plate and said clamping plate to give a fluidtight seal between said fixed plate and said movable plate, said gasket having an upstanding ring on the inner face of and spaced radially inwardly from the periphery of said movable plate and adapted to engage and deform plastically against said annular lip of said coupling member, the area of said movable plate enclosed by said ring being less than the area of said movable plate enclosed by the walls of said gasket whereby fluid under pressure confined by the cap assembly may pass within the walls of the gasket and exert a greater force on said movable plate, tending to seat said ring on said annular lip than it will on the inner face of said movable plate, tending to unseat said ring.

2. A pressure fuel cap assembly comprising a cap member and a coupling member, said coupling member having an end portion adapted to be affixed to a fuel tank and an opposite end portion having coupling means adapted to cooperate with opposite coupling means on said cap member, adapting said coupling member to be removably attached to said cap member, said coupling member having side walls between said end portions forming a passage therebetween to permit the flow of fluids, and a continuous lip on said side walls extending part way into said passage, said cap member comprising a fixed plate adapted to fit loosely within the side walls of said coupling member and having a spindle having portions extending both inwardly and outwardly from said fixed plate, a clamping plate on the outwardly extending portion of said spindle adjacent said fixed plate, the peripheries of said plates having clamping means adapted to clamp the edge of a gasket therebetween to form a fluidtight seal, an outer plate on said outwardly extending portion of said spindle carrying coupling means to cooperate with the coupling means on said coupling member, a movable plate loosely mounted for sliding movement on the inwardly extending portion of said spindle to provide a fluid passage between said movable plate and said spindle and adapted to fit loosely within the side walls of said coupling member, a compressed spring disposed between and bearing on said fixed plate and said movable plate to urge them apart and form a chamber therebetween, a flexible gasket bonded to the periphery of said movable plate and having walls extending therefrom to and clamped in the clamping means of said fixed plate and said clamping plate to give a fluidtight seal between said fixed plate and said movable plate, said gasket having an upstanding ring on the inner face of and spaced radially inwardly from the periphery of said movable plate and adapted to engage and deform plastically against said continuous lip of said coupling member, the area of said movable plate enclosed by said ring being less than the area of said movable plate enclosed by the walls of said gasket whereby fluid under pressure confined by the cap assembly may pass within the walls of the gasket and exert a greater force on said movable plate, tending to seat said ring on said continuous lip than it will on the inner face of said movable plate, tending to unseat said ring.

3. A pressure fuel cap assembly comprising a cap member and a coupling member, said coupling member having an end portion adapted to be affixed to a fuel tank and an opposite end portion having coupling means adapted to cooperate with opposite coupling means on said cap member, adapting said coupling member to be removably attached to said cap member, said coupling member having side walls between said end portions forming a passage therebetween to permit the flow of fluids, and a continuous lip on said side walls extending part way into said passage, said cap member comprising a fixed plate adapted to fit loosely within the side walls of said coupling member and having a spindle having portions extending both inwardly and outwardly from said plate, a clamping plate on the outwardly extending portion of said spindle adjacent said fixed plate, the peripheries of said plates having clamped means adapted to clamp the edge of a gasket therebetween to form a fluidtight seal, an outer plate on said outwardly extending portion of said spindle carrying coupling means to cooperate with the coupling means on said coupling member, a movable plate mounted for sliding movement on the inwardly extending portion of said spindle and adapted to fit loosely within the side walls of said coupling member, said movable plate having a fluid passage therethrough, a compressed spring disposed between and bearing on said fixed plate and said movable plate to urge them apart and form a chamber therebetween, a flexible gasket bonded to the periphery of said movable plate and having walls extending therefrom to and clamped in the clamping means of said fixed plate and said clamping plate to give a fluidtight seal between said fixed plate and said movable plate, said gasket having an upstanding ring on the inner face of and spaced radially inwardly from the periphery of said movable plate and adapted to engage and deform plastically against the lip of said coupling member, the area of said movable plate enclosed by said ring being less than the area of said movable plate enclosed by the walls of said gasket whereby fluid under pressure confined by the cap assembly may pass within the walls of the gasket and exert a greater force on said movable plate, tending to seat said ring on said lip than it will on the inner face of said movable plate, tending to unseat said ring.

4. A pressure fuel cap assembly comprising a cap member and a coupling member, said coupling member having an end portion adapted to be affixed to a fuel tank and an opposite end portion having coupling means adapted to cooperate with opposite coupling means on said cap member, adapting said coupling member to be removably attached to said cap member, said coupling member having side walls between said end portions forming a passage therebetween to permit the flow of fluids, and a continuous lip on said side walls extending part way into said passage, said cap member comprising a fixed plate adapted to fit loosely within the side walls of said coupling member and having a spindle having portions extending both inwardly and outwardly from said fixed plate, a clamping plate on the outwardly extending portion of said spindle adjacent said fixed plate, the peripheries of said plates having clamping means adapted to clamp the edge of a gasket therebetween to form a fluidtight seal, an outer plate on said outwardly extending portion of said spindle carrying coupling means to cooperate with the coupling means on said coupling member, a movable plate loosely mounted for sliding movement on the inwardly extending portion of said spindle to provide a fluid passage between said movable plate and said spindle and adapted to fit loosely within the side walls of said coupling member, a flexible gasket bonded to the periphery of said movable plate and having walls extending therefrom to and clamped in the clamping means of said fixed plate and said clamping plate to give a fluidtight seal between said fixed plate and said movable plate, said gasket having an upstanding ring on the inner face of and spaced radially inwardly from the periphery of said movable plate and adapted to engage and deform plastically against said continuous lip of said coupling member, the area of said movable plate enclosed by said ring being less than the area of said movable plate enclosed by the walls of said gasket whereby fluid under pressure confined by the cap assembly may pass within the walls of the gasket and exert a greater force on said movable plate, tending to seat said ring on said continuous lip than it will on the inner face of said movable plate, tending to unseat said ring.

5. A pressure fuel cap assembly comprising a cap member and a coupling member, said coupling member having an end portion adapted to be affixed to a fuel tank and an opposite end portion having coupling means adapted to cooperate with opposite coupling means on said cap member, adapting said coupling member to be removably attached to said cap member, said coupling member having side walls between said end portions forming a passage therebetween to permit the flow of fluids, and a continuous lip on said side walls extending part way into said passage, said cap member comprising a fixed plate adapted to fit loosely within the side walls of said coupling member and having a spindle having portions extending both inwardly and outwardly from said plate, a clamping plate on the outwardly extending portion of said spindle adjacent said fixed plate, the peripheries of said plates having clamping means adapted to clamp the edge of a gasket therebetween to form a fluidtight seal, an outer plate on said outwardly extending portion of said spindle carrying coupling means to cooperate with the coupling means on said coupling member, a movable plate mounted for sliding movement on the inwardly extending portion of said spindle and adapted to fit loosely within the side walls of said coupling member, said movable plate having a fluid passage therethrough, a flexible gasket bonded to the periphery of said movable plate and having walls extending therefrom to and clamped in the clamping means of said fixed plate and said clamping plate to give a fluidtight seal between said fixed plate and said movable plate, said gasket having an upstanding ring on the inner face of and spaced radially inwardly from the periphery of said movable plate and adapted to engage and deform plastically against the lip of said coupling member, the area of said movable plate enclosed by said ring being less than the area of said movable plate enclosed by the walls of said gasket whereby fluid under pressure confined by the cap assembly may pass within the walls of the gasket and exert a greater force on said movable plate, tending to seat said ring on said lip than it will on the inner face of said movable plate, tending to unseat said ring.

References Cited in the file of this patent

UNITED STATES PATENTS

| Number | Name | Date |
|---|---|---|
| 1,665,827 | Tillmann | Apr. 10, 1928 |
| 2,225,964 | Bailey | Dec. 24, 1940 |
| 2,581,536 | Johns | Jan. 8, 1952 |
| 2,581,537 | Maisch | Jan. 8, 1952 |